April 5, 1932.                M. BERSTED                1,852,398
                                TOASTER
                        Filed Feb. 19, 1930        3 Sheets-Sheet 1

INVENTOR
MARTIN BERSTED
BY
ATTORNEYS

April 5, 1932.                    M. BERSTED                    1,852,398
                                   TOASTER
                              Filed Feb. 19, 1930                3 Sheets-Sheet 2

INVENTOR
MARTIN BERSTED
BY
ATTORNEYS

April 5, 1932.  M. BERSTED  1,852,398

TOASTER

Filed Feb. 19, 1930  3 Sheets-Sheet 3

INVENTOR
MARTIN BERSTED
BY
ATTORNEYS

Patented Apr. 5, 1932

1,852,398

UNITED STATES PATENT OFFICE

MARTIN BERSTED, OF OAK PARK, ILLINOIS, ASSIGNOR TO BERSTED MANUFACTURING COMPANY, OF CHICAGO, ILLINOIS, A CORPORATION OF ILLINOIS

TOASTER

Application filed February 19, 1930. Serial No. 429,583.

This invention relates to improvements in bread toasters, generally.

An object of the invention is to provide a toaster including a toasting compartment having end, side and bottom walls adapted to receive and retain a slice of bread, said compartment having an opening at the top through which a slice of bread may be dropped by gravity to assume a toasting position within the compartment, one of said walls being movable to permit the bread to be discharged by gravity from said compartment, and means automatically operable to actuate said movable wall after a predetermined toasting interval.

A further object is to provide a toaster including a toasting compartment having end, side and bottom walls adapted to receive and retain a slice of bread, and a casing forming substantially a closed housing for said walls, said compartment and housing having an elongated opening at their tops through which a slice of bread may be dropped by gravity into said compartment to assume an upright toasting position, and one of said walls being movable, and a timing mechanism automatically operable to actuate said movable wall, after a predetermined time interval, to cause the bread to be discharged by gravity from said compartment.

A further object is to provide a toaster including a toasting compartment provided with a movable bottom, and means for automatically causing the actuation of said bottom to effect the release of the bread from the toaster, after a predetermined time interval.

A further object is to provide a toaster including a casing having a toasting compartment therein adapted to receive and retain a slice of bread, and said compartment having a pivoted bottom provided with means for automatically operating it, after a predetermined length of time, whereby the bread, when toasted will be discharged from the bottom of the compartment.

A further object is to provide a toaster comprising a casing having a toasting compartment therein provided with a hinged bottom, and a clock mechanism adapted to automatically actuate said bottom whereby the bread will be discharged by gravity from said compartment, after a predetermined time interval.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the selected embodiment of the invention here shown, there is illustrated, for purposes of disclosure, a toaster including a base member 2 having a casing mounted thereon, here shown comprising upright walls 3, 4, 5, and 6, and a top wall 7, suitably secured to the casing walls.

Figure 2:
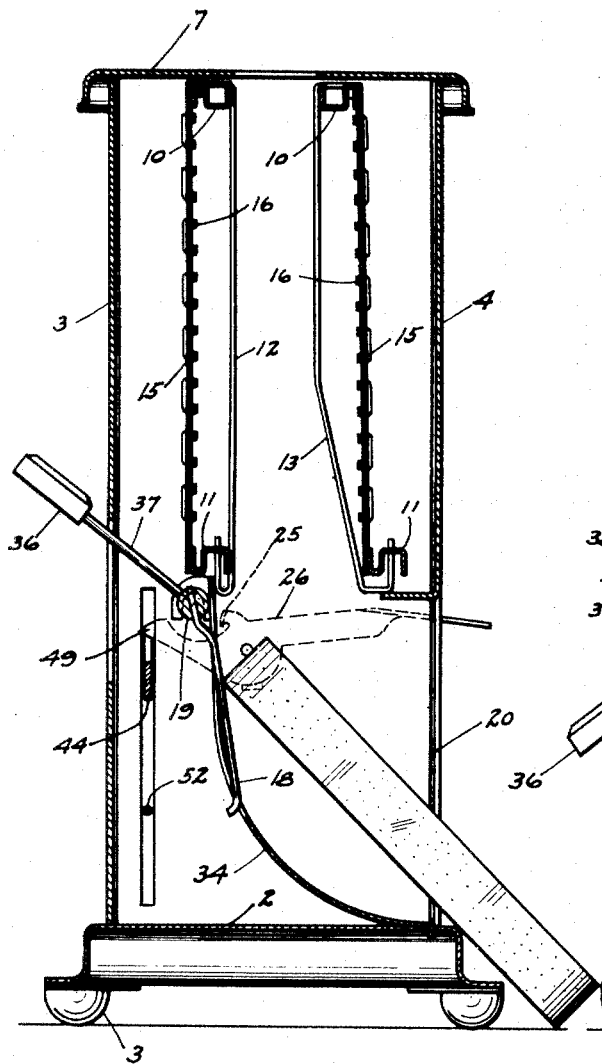
Figure 2 is a view similar to Figure 1 showing the bottom after having been actuated to cause the bread to be discharged from the toasting compartment by gravity.

A toasting compartment is provided within the casing or housing and is defined by inner end walls 8 and 9, and a plurality of small rods or wires 12 and 13, forming the side walls of the toasting compartment. An opening 14 is provided at the top of the toasting compartment through which a slice of bread may be dropped by gravity into said compartment. The upper portions of the inner end walls 8 and 9 are connected together by suitable tie members 10, and similar tie members 11 connect together the intermediate portions thereof. The tie members 10 and 11 cooperate to support the rods or wires 12 and 13, as shown in Figures 1 and 2.

Figure 3:
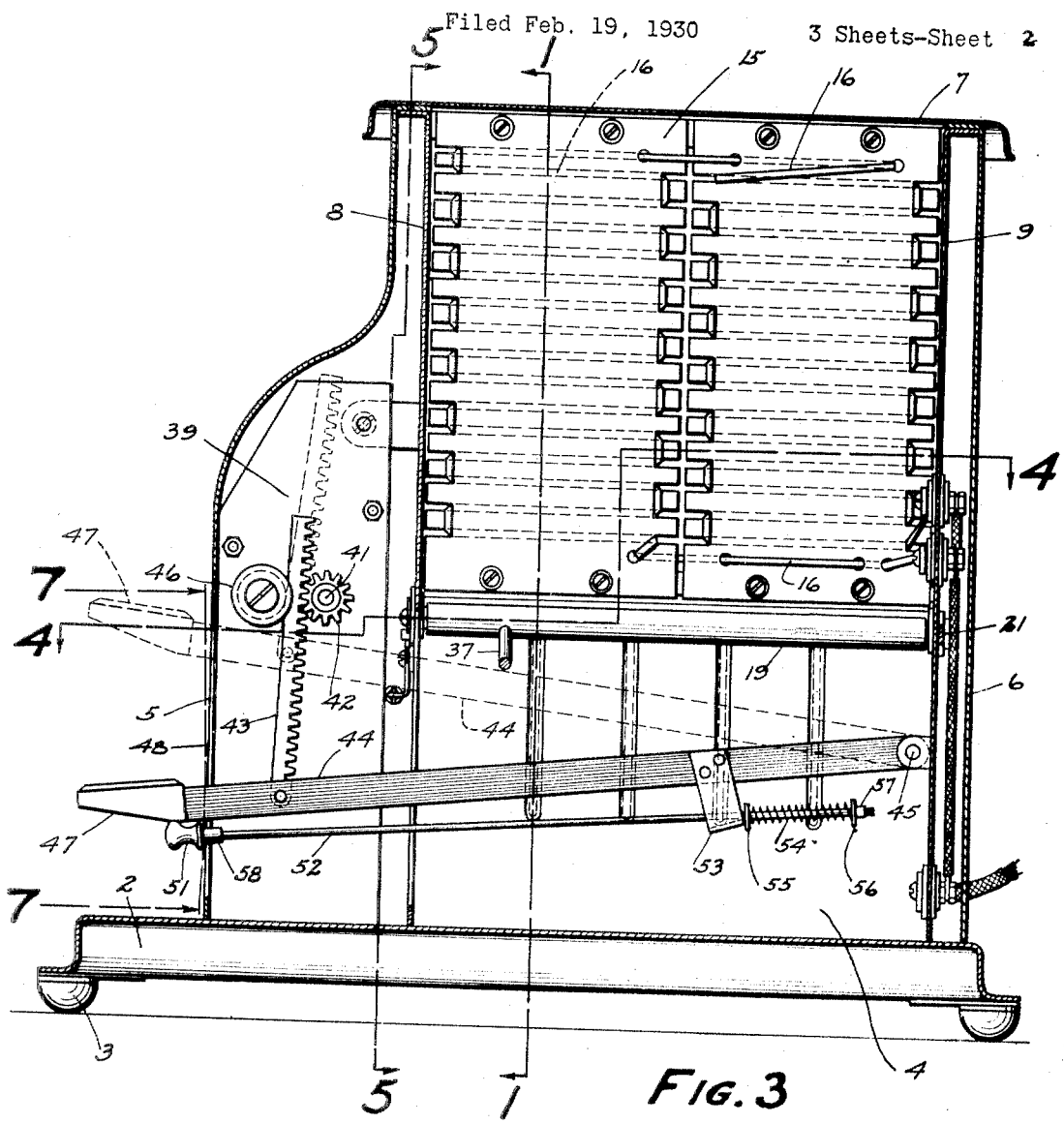
Figure 3 is a vertical sectional view on the line 3—3 of Figure 1.

Mica plates 15 are shown secured to the tie members 10 and 11, and upon these mica plates suitable resistance wires 16 are mounted which form the heating elements for the toaster. The mica plates 15 are preferably provided with serrated edges to which the resistance wires 16 are suitably secured. Two mica plates are preferably arranged at each side of the toasting compartment in abutting relation, and the combined widths of each pair of said plates is such as to substantially span the distance between the inner end walls 8 and 9, as shown in Figure 3. It will thus be seen that the mica plates form, in effect, auxiliary walls interposed between the outer casing walls 3 and 4, and the rods 12 and 13, forming the side walls of the toasting compartment. The heating elements 16 are horizontally disposed on the inner surfaces of the mica plates, as indicated in dotted lines in Figure 3.

Figure 4:
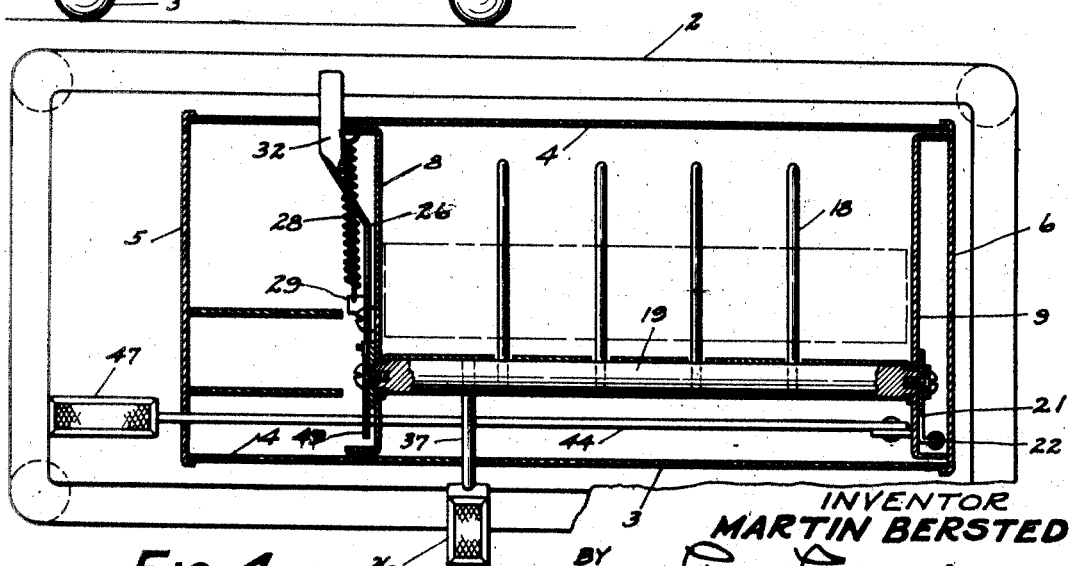
Figure 4 is a sectional plan view on the line 4—4 of Figure 3.

An important feature of this invention resides in the means provided for supporting a slice of bread within the toasting compartment, and whereby the bread may be discharged by gravity from the lower portion of the holder, or through the bottom thereof, when toasted. A plurality of spaced apart rods or wires 18 are secured to a rock shaft 19 having its terminals supported in suitable bearings provided in the walls 8 and 9, as shown in Figure 4. These rods cooperate to provide a support for the bread and will hereinafter be referred to as the bottom wall of the toasting compartment. A small crank arm 21 is secured to one end of the rock shaft and has a portion 22 bent outwardly to which one end of a tension spring 23 is connected, the opposite end of which is suitably secured to the wall 9. This spring constantly tends to rotate the shaft 19 in a direction to move the bottom 18 downwardly to bread-discharging position, as shown in full lines in Figure 2, to permit the bread to be discharged by gravity from the toasting compartment through an opening 20, here shown provided in the casing wall 4, as best shown in Figure 2.

Figure 1:
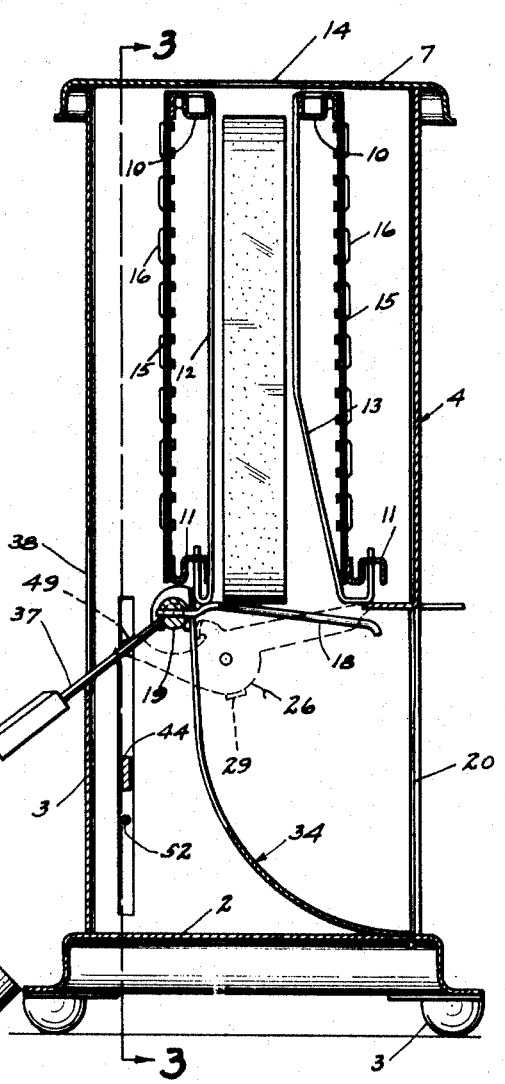
Figure 1 is a vertical sectional view on the line 1—1 of Figure 3, showing the movable bottom wall in bread-supporting position.
Figure 5:
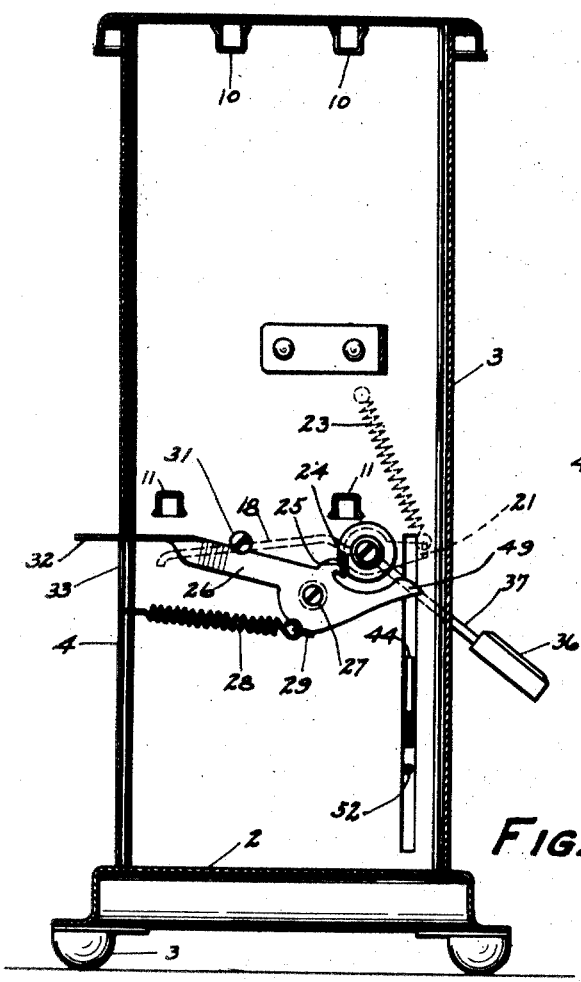
Figure 5 is a vertical sectional view on the line 5—5 of Figure 3, showing the means for retaining the movable bottom wall in bread-supporting position, said parts being shown in operative positions.

Means are provided for retaining the bottom wall 18 in operative or bread-supporting position, as shown in full lines in Figure 1, and dotted lines in Figure 5 and, as here shown, consists of a small detent 24 secured to the opposite end of the shaft 19 and adapted to be engaged by a lug 25 provided upon a lever 26 pivotally mounted upon the wall 8 by means of a pin 27. A spring 28 has one end secured to the portion 29 of the lever 26 and its opposite end to the wall 8 so as to normally hold the lever 26 in the position shown in Figures 1 and 5, against a suitable stop pin 31. When the lever 26 is thus positioned and the detent 24 is engaged with the lug 25, the rods 18, forming the bottom wall of the toasting compartment, will be retained in the position shown in Figures 1, 4, and 5. The lever 26 has a portion 32 projecting through a slot 33 in the side wall 4 of the casing, as best shown in Figure 5. By depressing the end portion 32 of the lever, the lug 25 will be moved out of engagement with the detent 24, whereupon the spring 23 will cause the bottom wall 18 to be moved downwardly to the position shown in Figures 2 and 6, thereby causing the bread supported thereon to be discharged by gravity from the toasting compartment onto a curved plate 34 and through the opening 20 provided in the side wall 4 of the casing.

The bottom wall 18 of the toasting compartment is provided with means for manually moving it from its inoperative position shown in Figure 2, to its operative position shown in Figure 1. To thus actuate the bottom, a finger grip 36 is mounted upon one end of a rod 37, the opposite end of which is suitably secured to the shaft 19. The rod 37 is movable vertically in a slot 38 provided in the side wall 3 of the casing, and the finger grip 36 is situated so that it may be conveniently operated to return the bottom 18 to its operative position, as shown in Figure 1. When the finger grip 36 is depressed, the detent 24 secured to the shaft 19, will be moved into the path of the lug 25 provided upon the lever 26, so that when the operator removes his finger from the grip 36, the detent 24 will engage the lug 25 and retain the bottom 18 in its operative position, shown in Figures 1 and 5.

Means are also provided for automatically releasing the bottom wall 18 after a predetermined toasting interval. Such a means is indicated in Figure 3, and comprises a suitable clock or timing mechanism 39, having a drive shaft 41 upon one end of which a pinion 42 is suitably secured. The pinion 42 meshes with a rack bar 43 having one end pivotally connected to an operating lever 44 pivoted at 45 to a fixed support such as the inner end wall 9. A flanged guide wheel 46 retains the rack bar 43 in constant mesh with the pinion 42. The timing mechanism indicated in the drawings may be of the spring-actuated type, and is rendered operative by depression of the operating lever 44. One end of the lever 44 projects through a slot 48 provided in the casing wall 5 and is provided with a finger grip 47, whereby the lever may be conveniently depressed, each time a slice of bread is inserted into the toasting compartment. The construction of the timing mechanism is such that each time the lever 44 is depressed, the mechanism will be rendered operative because of the reverse rotation imparted to the driving shaft 41, which rotation may cause a suitable drive spring, not shown, to be wound up. When the operator removes his finger from the grip 47, the timing mechanism will operate to slowly return the lever 44 to the dotted line position shown in Figure 3.

Figure 6:
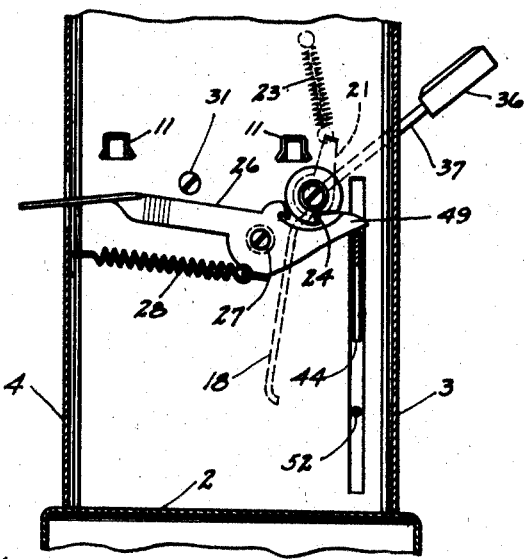
Figure 6 is a view similar to Figure 5, partially broken away, and showing the parts after having been actuated to release the bread.

The operating lever 44 is guided in its up and down movement by the walls of the slot 48 in the end wall 5, and is adapted to engage a projection 49 provided upon the release lever 26, as best shown in Figures 5 and 6. This projection is normally positioned in the path of the lever 44 so that just before the lever reaches the limit of its upward movement, it will engage the projection 49 and oscillate the release lever 26 and cause the detent 24 to become disengaged from the lug 25 provided upon the release lever 26, whereupon the rods 18, constituting the bottom wall of the toasting compartment, will immediately be moved downwardly from the position shown in Figure 1 to that shown in Figure 2, and cause the discharge of the bread from the toasting compartment.

Figure 7:
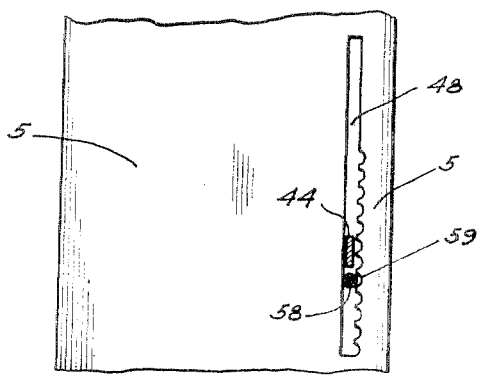
Figure 7 is a detail sectional view on the line 7—7 of Figure 3, illustrating a means for varying the timing of the clock mechanism.

To vary the length of the toasting period, there is shown in Figures 3 and 7, a stop member 51 including a rod 52 having one end slidably supported in a bracket 53, preferably secured to the operating lever 44. A compression spring 54 is shown coiled about the rod 52 and has one end seated against a washer 55 provided adjacent to the bracket 53, and its opposite end against a similar washer 56 terminally mounted upon the end of the rod 52 by means of an adjusting nut 57. The stop member 51 has a hub 58 adapted to be selectively received in one of a plurality of notches 59, provided in an edge of the slot 48 in which the operating lever 44 travels. The relative position of the stop member 51 in the slot 48, limits the downward movement of the operating lever 44, and therefore controls the timing of the clock mechanism. This will readily be understood when it is known that the timing mechanism is adapted to operate at one speed only, regardless of the operative position in which the lever 44 may be in. It therefore follows that if the stop member 51 were positioned in one of the lower notches 59, it would take longer for the lever 44 to return to its normal position, than it would if the stop member 57 were positioned in one of the upper notches 59, it being understood that the operating lever 44 returns to its normal starting position, indicated in dotted lines in Figure 3, at the conclusion of each toasting operation.

The stop mechanism herein disclosed may be varied in numerous ways without departing from the scope of the invention.

I claim as my invention:

1. A toaster including a casing having a toasting compartment therein, a hinged bottom for said compartment including a plurality of rods secured to a rock shaft in spaced relation, a detent secured to one end of said rock shaft, a lever pivoted within the casing and having a projection adapted to engage said detent and retain the bottom in operative position, a spring constantly urging the projection on said lever into the path of said detent, and a portion of said lever projecting through an opening in said casing whereby said lever may be manually actuated to prematurely release said bottom.

2. A toaster including a casing having a toasting compartment therein, a hinged bottom for said compartment, a rock shaft supporting said bottom, a detent secured to one end of said rock shaft, a lever pivoted within the casing and having a projection adapted to engage said detent and retain the bottom in operative position, a spring constantly urging the projection on said lever into the path of said detent, an end portion of said lever projecting through an opening in said casing whereby said lever may be manually actuated to prematurely release said bottom, and a timing mechanism adapted to automatically release said bottom after a predetermined time interval.

In witness whereof, I have hereunto set my hand this 11th day of February 1930.

MARTIN BERSTED.